United States Patent
Hooli et al.

(10) Patent No.: US 9,313,801 B2
(45) Date of Patent: Apr. 12, 2016

(54) RESOURCE SETTING CONTROL FOR TRANSMISSION USING CONTENTION BASED RESOURCES

(75) Inventors: Kari Juhani Hooli, Oulu (FI); Esa Tapani Tiirola, Kempele (FI); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 720 days.

(21) Appl. No.: 13/499,403

(22) PCT Filed: Oct. 2, 2009

(86) PCT No.: PCT/EP2009/062842
§ 371 (c)(1),
(2), (4) Date: Mar. 30, 2012

(87) PCT Pub. No.: WO2011/038780
PCT Pub. Date: Apr. 7, 2011

(65) Prior Publication Data
US 2012/0182977 A1    Jul. 19, 2012

(51) Int. Cl.
*H04J 3/00*    (2006.01)
*H04W 72/12*    (2009.01)
*H04W 74/08*    (2009.01)

(52) U.S. Cl.
CPC ...... *H04W 72/1278* (2013.01); *H04W 72/1268* (2013.01); *H04W 74/08* (2013.01)

(58) Field of Classification Search
None
See application file for complete search history.

(56) References Cited

U.S. PATENT DOCUMENTS

| 9,203,580 B2 * | 12/2015 | Terry ............... H04W 56/0045 |
| 2009/0103558 A1 | 4/2009 | Zangi et al. .................. 370/447 |
| 2010/0118788 A1 * | 5/2010 | Ohta .................. H04W 74/008 370/328 |
| 2012/0099453 A1 * | 4/2012 | Sagfors et al. ................ 370/252 |
| 2012/0163322 A1 * | 6/2012 | Larmo et al. .................. 370/329 |

FOREIGN PATENT DOCUMENTS

WO    WO 2009/038381 A2    3/2009

OTHER PUBLICATIONS

R2-093812, 3GPP TSG-RAN WG2 #66bis, Los Angeles, USA, Jun. 29-Jul. 3, 2009, "Contention Based Uplink Transmissions", Ericsson, ST-Ericsson, 4 pgs.

* cited by examiner

*Primary Examiner* — Jae Y Lee
*Assistant Examiner* — Thinh Tran
(74) *Attorney, Agent, or Firm* — Harrington & Smith

(57) ABSTRACT

There is proposed a mechanism by means of which resources for a data transmission between a user equipment and a base transceiver station are set. For this purpose, a resource dedicated to the user equipment (like an SR resource) is combined with at least one contention based resource allocated to a contention based transmission by the user equipment (like a CB-PUSCH resource). The at least one contention based resource to be combined is selected by executing a mapping according to a predetermined rule and based on an information indicating a specific resource element dedicated to the user equipment to at least one set of available contention based resources, and by determining an information identifying at least one resource element of the at least one contention based resource.

27 Claims, 9 Drawing Sheets

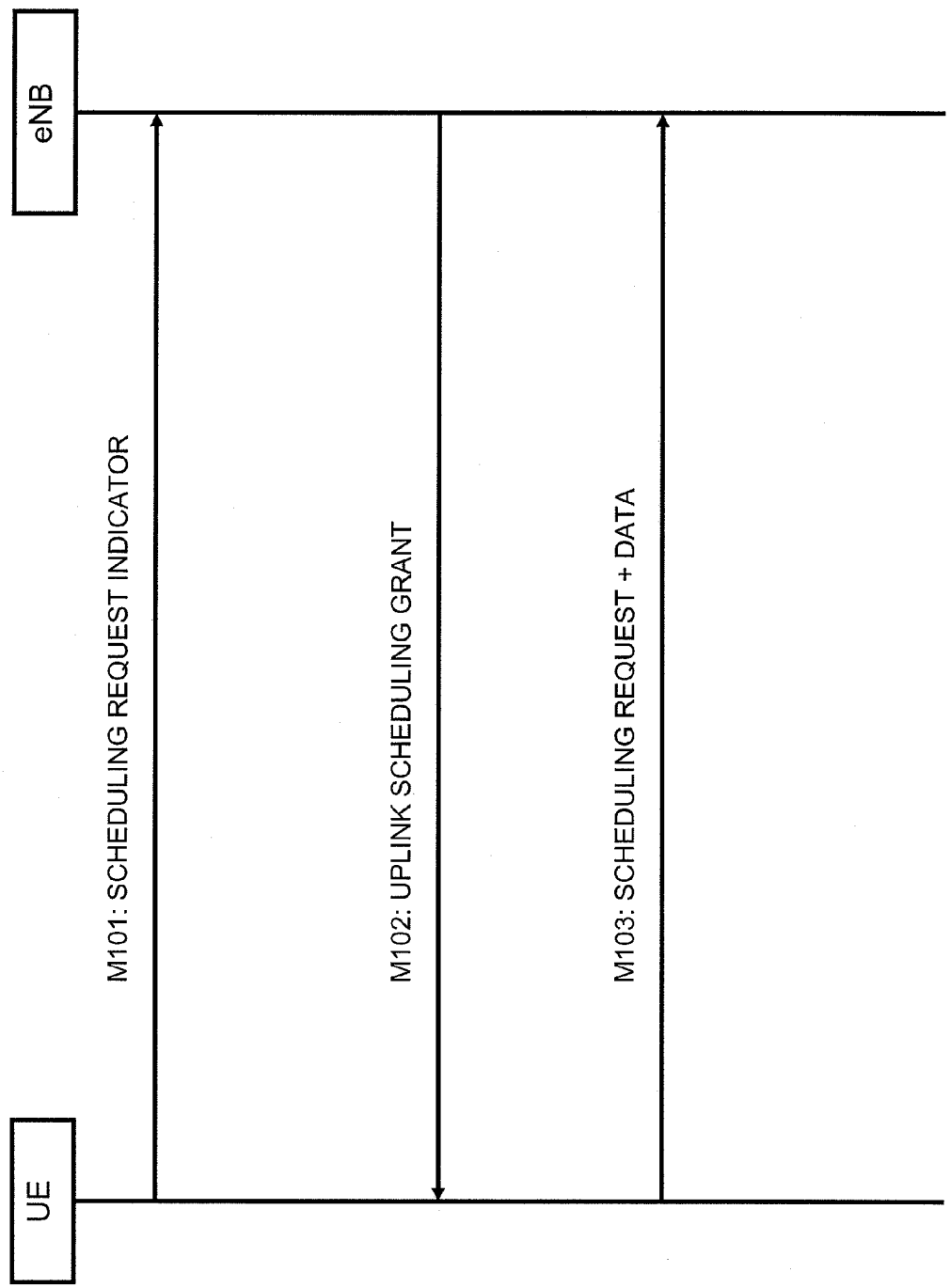

RESOURCE SETTING CONTROL FOR TRANSMISSION USING CONTENTION BASED RESOURCES

BACKGROUND OF THE INVENTION

1. Field of the Invention

The present invention relates to a mechanism for setting resources for a data transmission between two network nodes, i.e. a user equipment and a base transceiver station. In particular, the present invention is related to a method and apparatus by means of which resources for a data transmission between a user equipment and a base transceiver station, such as an enhanced Node B (eNB) can be provided in case (additional) resources are required for the transmission, for example when insufficient resources are presently dedicated to the user equipment.

2. Related Prior Art

In the last years, an increasing extension of communication networks, e.g. of wire based communication networks, such as the Integrated Services Digital Network (ISDN), or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), Long Term Evolution (LTE) or other wireless communication system, such as the Wireless Local Area Network (WLAN) or Worldwide Interoperability for Microwave Access (WiMax), took place all over the world. Various organizations, such as the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMax Forum and the like are working on standards for telecommunication network and access environments.

Generally, for properly establishing and handling a communication connection between network elements such as a user equipment (UE) and another communication equipment or user equipment, a database, a server, etc., one or more intermediate network elements such as base transceiver stations, control network elements, support nodes, service nodes and interworking elements are involved.

The first "step" for establishing a communication connection is usually a connection between the UE and the base transceiver station representing the entry point to the communication network. There may be a plurality of UEs connected to one or more base transceiver stations. A base transceiver station is generally a fixed station, and may be, for example, an access point (AP), a base station (BS), an evolved NodeB (eNB) or the like. In the following, the base transceiver station is assumed to be an eNB implemented in an LTE environment.

Generally, a communication from the UE to the eNB is referred to as uplink communication (UL), and communication from the eNB to the UE is referred to as downlink communication (DL). The eNB may comprise radio frequency transmitter(s) and the receiver(s) used to communicate directly with the UE. Similarly, each UE may comprise radio frequency transmitter(s) and the receiver(s) used to communicate directly with the eNB.

For controlling a communication connection, it is necessary to exchange control information like control information bits in uplink and downlink directions. For example, a one bit scheduling request indicator (SRI) is transmitted in uplink, when UE has data to be transmitted in uplink. Furthermore, an indicator of downlink channel quality (CQI) is transmitted in the uplink to support UE scheduling in the downlink. Such uplink control information is transmitted, for example, by means of a so-called physical uplink control channel (PUCCH), as defined by 3GPP for evolved universal terrestrial radio access (EUTRA) or 3GPP LTE. PUCCH is designed to provide a high transmission reliability.

In addition to PUCCH, there is also defined a so-called physical uplink shared channel (PUSCH), which is used, for example, for transmission of uplink user data. PUSCH may be dynamically scheduled, i.e. time-frequency resources of PUSCH may be re-allocated for every sub-frame (wherein the UE is informed of the allocation of resources by using a so-called Physical Downlink Control Channel (PDCCH)), or resources of the PUSCH may be allocated semi-statically, i.e. semi-persistent scheduled. The idea of PUSCH is that any given time-frequency PUSCH resource may be used by any UE (e.g. depending on scheduling).

In the following, an uplink control channel, such as PUCCH, may be a frequency hopping resource located symmetrically in both edges of a system bandwidth. An uplink shared channel, such as PUSCH, may can be allocated in any place of the system bandwidth, possibly also overlapping with PUCCH. Hence, PUCCH and PUSCH may be different in such that frequency resources allocated for PUCCH are found at the two extreme edges of the uplink frequency spectrum while frequency resources used for PUSCH are in between. PUSCH is designed for transmission of user data, so that re-transmissions are possible. Furthermore, PUSCH is generally scheduled with less stand-alone sub-frame reliability than PUCCH. One reason for this is that physical layer re-transmission (such as a Hybrid Automatic Repeat reQuest) is supported in PUSCH.

There may be a situation where the UE has data in a buffer which are to be transmitted in the uplink direction but where no or insufficient transmission resources to the eNB are presently provided. In such a case, it becomes necessary to either request for additional resources to be granted by the communication control network element, i.e. the eNB, or to use commonly available resources for example on PUSCH which are not specifically dedicated. In both cases, there may occur either a delay in the transmission or the reliability of a correct transmission may decrease.

A mechanism which is related to such a situation is, for example, provided in by current LTE specifications, where as a feature of the LTE UL system a fast uplink scheduling request mechanism for an active mode UEs (i.e. being in the so-called RRC_CONNECTED (RRC: Radio Resource Control) state) is provided when the UE is synchronized by the eNB but has no valid UL grant on PUSCH available. In this case, the UE indicates the need for UL resources by means of the scheduling request indicator (SRI), for example.

In FIG. 7, an example of an existing resource requesting scheme is depicted. As can be seen in FIG. 7, the UE transmits, after having noted the need for additional resources due to the presence of data in a buffer and the missing of dedicated resources e.g. on PUSCH, a scheduling request indicator to the eNB (step M101). The eNB processes the request and searches for available resources in order to provide an asynchronous grant of additional resources available for the UE in uplink. After determining the corresponding resources, an uplink scheduling grant is sent (M102) to the requesting UE which is identified, for example, on the basis of the dedicated SR resource (on PUCCH) dedicated to the specific UE, for informing about the allocated resource. The UE detects the granted resources from this message and transmits in step M103 correspondingly the data to be transmitted in uplink, accompanied by an additional scheduling request, if required.

However, the procedure shown in FIG. 7 requires some time and causes thus a delay in the uplink transmission (compared to a case where the data could be transmitted immediately), i.e. a certain UL latency, due to the signaling taking place prior the actual data transmission. Furthermore, a signaling overhead is produced.

In order to reduce the UL latency, it is possible to consider different approaches to be implemented in the connection control. For example, the latency may be reduced by reducing the periodicity of scheduling requests. Another approach would be a pre-allocation of resources on the shared channel (PUSCH) to specific users which however reduces the flexibility and available bandwidth, and does also not represent a capacity optimized solution in particular in longer term scenarios. Alternatively, it may be contemplated to use a so-called contention based uplink transmission scheme where a plurality of UE has access to the same PUSCH resources, for example.

With regard to the latter approach based on a contention based (CB) transmission, this is achieved, for example, by allowing CB transmission only in uplink resource blocks that have not been reserved for a contention free uplink transmission. A dynamic assignment of uplink resources for CB transmission may be done by using PDCCH. Specifically, the eNB informs the UE that resources are generally, available, either by broadcast or dedicated signaling. The UE monitors on basis of the information from the eNB for available CB grants. After a CB grant for the resources is obtained, the UE transmits the data on contention-based PUSCH.

With the contention based (CB) transmission, it is possible to overcome specific problems caused by scheduling request (SR) procedures, in particular with regard to latency and signaling overhead. For example, SR may increase UL data transmission delay by several milliseconds, e.g. at least 5 ms, compared to a contention based transmission.

However, there may be other problems when using the CB transmission.

For example, in the case when a collision probability is high, e.g. when only few resources are available for the CB transmission or a high number of user equipments tries to use the CB transmission scheme, it is very difficult to predict a delay performance, and the delay performance as such may become bad. As an outcome, it is required to provide a high number of PUSCH resources for CB transmission so as to keep the collision probability low enough. This, however, reduces the number of available resources for other transmissions and may result in a higher overall processing load.

Furthermore, in case of the contention based transmission, the complexity of a receiver at the eNB side may be increased. This is caused, for example, by the requirement that the receiver has to be able to perform blind decoding for the CB resources as the sending source and the used coding scheme thereof can not be known, due to the nature of the shared channel principle. Thus, the receiver on the eNB side has to test possibly all used modulation and coding formats which requires increased receiver complexity.

Also performance issues have to be considered in case of CB transmission. For example, as a common resource is used, an identification of the sending UE has to be included in the signaling (i.e. inclusion of UE-ID in a MAC (Media Access Control) packet which has a specific size (e.g. up to 24 bits). This additional data reduces the UL coverage area.

Moreover, the CB transmission does not support specific error detection and correction methods, such as Hybrid Automatic Repeat Request (HARQ). Specifically, the CB transmission offers no support for ACKnowledgment (ACK) feedback, for example via a Physical Hybrid Automatic Repeat Request Indicator Channel (PHICH) since an ACK for a "hidden" UE causes higher layer errors. Moreover, in case when a transmission via PUSCH is failed, i.e. in case when PUSCH decoding fails, it is not possible to identify the sending UE, i.e. no capability to identify the goal for a NonACKnowledgment (NACK) is present. However, due to the lack of, for example, HARQ capability of the CB transmission scheme, a possible coverage area for contention based resource is limited. This will in turn impact to the delay performance as well.

SUMMARY OF THE INVENTION

Thus, it is an object of the invention to provide an improved mechanism for setting resources for a data transmission between two network nodes such as a user equipment and a base transceiver station. In particular, it is an object of the present invention to provide an improved method and apparatus capable of setting resources for a data transmission between a user equipment and a base transceiver station wherein a delay or latency performance in the uplink direction can be enhanced.

These objects are achieved by the measures defined in the attached claims.

According to an example of the proposed solution, there is provided, for example, a method comprising setting resources for a data transmission between a user equipment and a base transceiver station, combining a resource dedicated to the user equipment with at least one contention based resource allocated to a contention based transmission by the user equipment, wherein the combining comprises selecting the at least one contention based resource to be combined by executing a mapping according to a predetermined rule and based on an information indicating a specific resource element dedicated to the user equipment to at least one set of available contention based resources, and determining an information identifying at least one resource element of the at least one contention based resource.

In addition, according to an example of the proposed solution, there is provided, for example, an apparatus comprising a first processing portion configured to set resources for a data transmission between a user equipment and a base transceiver station, a second processing portion configured to combine a resource dedicated to the user equipment with at least one contention based resource allocated to a contention based transmission by the user equipment, wherein the second processing portion comprises a selector configured to select the at least one contention based resource to be combined, a mapper configured to execute a mapping according to a predetermined rule and based on an information indicating a specific resource element dedicated to the user equipment to at least one set of available contention based resources, and a determiner configured to determine an information identifying at least one resource element of the at least one contention based resource.

According to further refinements, the method may comprise one or more of the following features:
   the resource dedicated to the user equipment may comprise a scheduling request resource element transmitted via an uplink control channel, and the at least one contention based resource may comprise a contention based physical resource element allocated to the contention based transmission via an uplink shared channel;

the information indicating a specific resource element dedicated to the user equipment may be a scheduling request resource index, and the information identifying the at least one resource element of the at least one contention based resource may be a resource index of the contention based physical resource element;

the information identifying the at least one resource element of the at least one contention based resource further may comprise at least one of a demodulation reference signal index, and a temporary identification information for the user equipment included in a payload of the contention based transmission;

the mapping process may comprises executing a pseudo-random calculation based on predetermined input parameters known to the user equipment and the base transceiver station;

the predetermined input parameters may comprise at least one of a number representing an identification element of the user equipment, a frame number, and at least one preset numerical value;

a time window may defined based on a transmission time for the resource dedicated to the user equipment, wherein the time window may be defined by setting a minimum delay threshold and a maximum delay threshold in relation to the transmission time for the resource dedicated to the user equipment, wherein an access to the contention based resource may be allowed only in the time window;

the mechanism may be executed in the user equipment, wherein the mechanism may be executed by the user equipment in case data are to be transmitted in an uplink direction and the resource dedicated to the user equipment is to be used for obtaining uplink resources, wherein the user equipment may transmit data by using the resource dedicated to the user equipment and at least a part of the data to be transmitted in the uplink direction by using the selected contention based resource;

alternatively, the mechanism may be executed in the base transceiver station, wherein then a detection for the resource dedicated to the user equipment in the data transmission from the user equipment may be executed, wherein in case a positive indication regarding the resource dedicated to the user equipment is obtained, a detection for the contention based resource may be executed; in this case, optionally, a detection whether a collision between transmissions from a plurality of user equipments at the contention based resource is present may be executed on the basis of a detection result for a transmission using the resource dedicated to the user equipment and on the basis of the predetermined mapping rule, and if a collision is present, a failed transmission may be identified, the user equipment of the plurality of user equipments may be determined on the basis of the information identifying the at least one resource element of the at least one contention based resource and the information indicating the specific resource element dedicated to the user equipment; furthermore, optionally in this case, an error detection and correction procedure may be executed based on data received with the contention based resource, and in case a failed transmission is detected, the user equipment sending the data being not correctly received may be identified on the basis of at least one of the information identifying the at least one resource element of the at least one contention based resource and the information indicating the specific resource element dedicated to the user equipment; the error detection and correction procedure may comprise a hybrid automatic repeat request procedure.

at least one of a modulation and coding scheme parameter and a power control parameter for the transmission between the user equipment and the base transceiver station may be configured, wherein at least one of the parameters may be individually set for each of a plurality of user equipments on the basis of control data received for the contention based resource selected for each user equipment.

Moreover, according to another example of the proposed solution, there is provided, for example, a computer program product for a computer, comprising software code portions for performing the steps of the above defined method, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, a resource setting mechanism can be provided by means of which resources available for a contention based transmission, i.e. commonly available resources, can be combined with resources dedicated to the user equipment which allows a reliable identification of the user equipment sending data via the contention based transmission. Thus, uplink delay can be significantly reduced since no time consuming scheduling request procedure is required for obtaining uplink resources when a dedicated resource on e.g. PUSCH is not provided at this time to the UE. Furthermore, at the same time, information usable for identifying the sending user equipment are retrievable by the transmission due to the link to the dedicated resource, such as an scheduling request resource, so that further processing like error detection and correction procedures can be executed. Since a transmission using, for example, SR resources represents a very reliable transmission, the overall robustness of the system can be improved with the possibility to flexibly and quickly transmit data via less reliable contention based resources.

Even in a case where the contention based transmission can not be decoded correctly or the transmission failed, a fallback to a transmission scheme using only the dedicated resource, e.g. a conventional scheduling request procedure, is immediately possible as the necessary information are already transmitted. The same applies in cases where no resources are available for the contention based transmission, for example on PUSCH, since the dedicated resource is available. Hence, the proposed mechanism does not cause a greater delay or latency in comparison to existing schemes, like an SR mechanism, even in a worst case scenario, while on the other hand a so-called delay-tail problem of contention based PUSCH is solved. Furthermore, a collision probability can be increased which in turn improves the efficiency of the system.

Furthermore, also the system operation as a whole is improved when employing such a deterministic usage of contention based resources. As identification of the sending UE is supported by the usage of the dedicated resource, an inclusion of a complete identification of the sending user equipment, i.e. a full UE-ID, on the CB-resource can be avoided. Instead, a shorter temporal UE-ID may be used which requires less data space as it has a considerably shorter length than a normal UE ID. Thus, payload on the contention based resource, like CB-PUSCH payload, can be reduced.

Furthermore, error detection and correction mechanisms like HARQ are easily implementable. For example, HARQ can be supported since the UE performing contention based transmission (e.g. transmitting CB-PUSCH) can be identified even if the CB-PUSCH is not decoded correctly. Thus, the usage of e.g. HARQ mechanisms reusing existing signalling is possible.

Also the implementation complex receivers at the base transceiver station side being capable for contention based transmission (like receivers capable for blind decoding) can be avoided. This means that by using the proposed mechanism the complexity of the base transceiver station, such as an eNB, can be decreased since blind decoding capability at the eNB side can be reduced or omitted, standardized equipment is implementable at the eNB side avoiding excessive/avoidable receiver complexity, and a special receiver, such as a special CB-PUSCH receiver, is not required.

As the proposed mechanism uses resources on a shared channel, a common resource pool can be used which increases the system flexibility and efficiency by using resources otherwise being unused. It is to be noted that there may exist more than one resource pool available for an access to a contention based transmission. This case enables UE differentiation into multiple CB-access classes e.g., based on the bandwidth needed.

Moreover, the proposed mechanism enables a prediction of collisions when using the contention based resources, i.e. when more than one user equipment transmit data with the same CB-PUSCH resource, for example. This is possible by means of the detection of the dedicated resource, like the SR resource, which in combination with pre-known parameters and mapping rules can be used to determine the selected CB resource for each UE. Furthermore, since orthogonal demodulation reference signal (DM RS) is often available, a suitable receiver, like a multiple-user multiple-input multiple-output (MU-MIMO) receiver (capable of contention based MU-MIMO) may solve corresponding collisions. In the contention based MU-MIMO, orthogonal reference signal resources required for a reliable MU-MIMO (i.e., UEs are sharing the same frequency and time resource) reception are reserved in contention based manner. Thus, generally, a collision probability can be increased which means that the efficiency of contention based transmission e.g. via CB-PUSCH increases.

Also an SR false alarm performance can be improved since a DTX (Discontinuous Transmission) detection is available also in CB-PUSCH.

The above and still further objects, features and advantages of the invention will become more apparent upon referring to the description and the accompanying drawings.

BRIEF DESCRIPTION OF THE DRAWINGS

FIG. 7 shows a signaling diagram illustrating a known scheduling request procedure.

DESCRIPTION OF PREFERRED EMBODIMENTS

Figure 1:
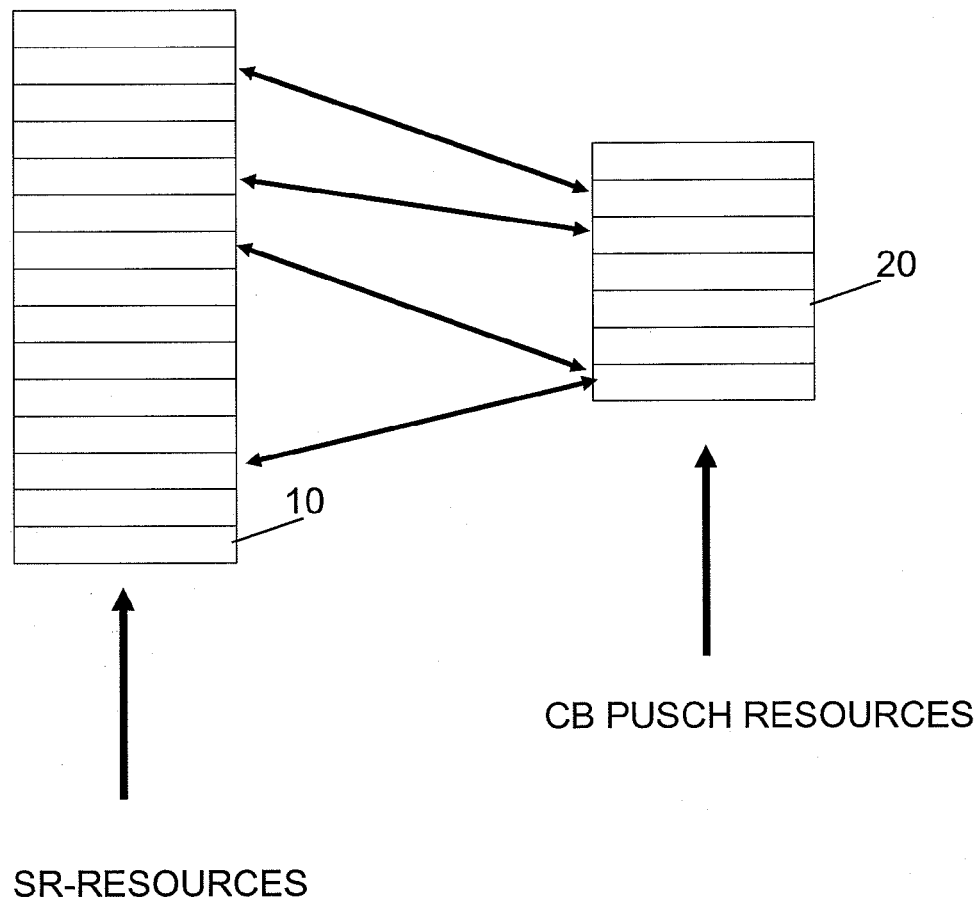
FIG. 1 shows a diagram illustrating an example of a mapping between resources dedicated to a user equipment and resources allocated to a contention based communication.

In the following, examples and embodiments of the present invention are described with reference to the drawings. For illustrating the present invention, the examples and embodiments will be described in connection with a communication system which may be based on a 3GPP LTE where an eNB is used as a base transceiver station. However, it is to be noted that the present invention is not limited to an application in such a system or environment but is also applicable in other communication systems, connection types and the like.

A basic system architecture of a communication network in which a resource setting mechanism according to an example of an embodiment of the invention may be implemented may comprise a commonly known architecture of a wired or wireless access network subsystem. Such an architecture comprises one or more access network element or control units, radio access network elements, or base transceiver stations, with which a user equipment is capable to communicate via one or more channels for transmitting several types of data. The general functions and interconnections of these elements are known to those skilled in the art and described in corresponding specifications so that a detailed description thereof is omitted herein. However, it is to be noted that there are provided several additional network elements and signaling links used for a communication connection or a call between user terminals and/or servers than those described in detail herein below.

Furthermore, the network elements and their functions described herein may be implemented by software, e.g. by a computer program product for a computer, or by hardware. In any case, for executing their respective functions, correspondingly used devices, such as a base transceiver station, an eNB or a user equipment, comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

According to one example of an embodiment of the invention, a situation may be assumed where UEs, for example active mode UEs being in an RRC_CONNECTED state in a 3GPP LTE network environment and being synchronized by a base transceiver station like a eNB as a communication control network element, has data in a buffer which has to be transmitted uplink (i.e. towards the eNB), but where the UE has no valid UL grant (i.e. dedicated resources) on a user data channel, such as PUSCH, available.

Thus, according to the example of an embodiment, a transmission scheme is used where a CB transmission via the user data channel, for example a transmission using CB-PUSCH resources, is executed wherein an additional processing is performed so as to select specific resources. Specifically, in order to provide information regarding the source of the CB transmission using CB-PUSCH resource, for example, the CB resources (CB-PUSCH) to be used is selected by a mapping or combination with a resource dedicated to the UE, for example dedicated scheduling request (SR) resources. That means that by combining the two resources the (dedicated) SR resource acts as a preamble for CB-PUSCH resource used for user data transmission, for example, while the pool of which the CB resource is taken is commonly available to other UEs as well.

According to the example of the embodiment, the transmission via CB-PUSCH is always linked to a accompanying transmission with the SR resource. For example, SR transmission utilizes an on-off keying based signaling which means that only a positive SR is transmitted while in case of a negative SR (i.e. no scheduling request is to be transmitted) DTX is present.

In FIG. 1, an example of the processing used to combine the dedicated SR resource and a CB-PUSCH resource for the uplink transmission is illustrated. In FIG. 1, on the left side, dedicated SR resources each being allocated to a UE are shown as a schematic stack 10. In other words, each resource element of the stack 10 illustrating the SR resources represents a dedicated SR resource for a UE, wherein the resource element is identifiable, for example, by means of an index. On the right side, available resources on a shared channel for a contention based transmission, such as CB-PUSCH resources, are illustrated as a schematic stack 20. This means that each resource element of the stack 20 illustrating the CB-PUSCH resources represents a resource which is commonly available for a CB transmission, for example (i.e. they are no dedicated resources or contention free resources, for example).

It is to be noted that there may be also system where a scheduling request is transmitted by using one or more PUCCH format 1 channels, for example in an LTE-Advanced system. That means that there are more than one SR resource configured for a specific UE, for example in order to support transmit diversity for the SR. In such a situation, the mapping of SR resources to CB resources as depicted in FIG. 1 comprises a link of the dedicated resources (i.e. all SR resources dedicated to the specific UE) to a corresponding CB-PUSCH resource or the like.

Indicated by arrows between the SR resource stack 10 and the CB-PUSCH stack 20, the combination of resources is shown. That means that it is (pre-)determined which of the available CB-PUSCH resources is allocated to a SR resource. In other words, in order to make usage of a contention based resource deterministic, there is performed a mapping between the certain SR resource (or a certain UE allocated to the given SR resource(s)) and CB-PUSCH resource(s) which can be used by the certain UE. The mapping is made in pseudo-random manner, i.e. there is a pre-defined algorithm or specific rule according to which a SR resource is mapped on a CB-PUSCH resource. Thus, it is possible to execute the mapping independently at different sites, for example in the UE and the eNB, with the same result. For the mapping, information indicating the respective resource element are determined, such as an index of the corresponding CB-PUSCH resource element to be combined with a specific SR resource.

As a result of the mapping, a specific CB-PUSCH resource is linked to a SR resource. There may be also a situation where, for example due to the used mapping rule or algorithm used for mapping, or due to a lack of available resources for CB transmission, more than one SR resource is mapped on one and the same CB-PUSCH resource (shown in FIG. 1 by the lower two arrows). In such a collision situation, further processing may be executed which is described later.

It is noted that in case a mapping between the SR resource and the CB-PUSCH resource fails on either side of the transmission (i.e. at the UE when no CB-PUSCH resource is available, or at the eNB when a decoding of the transmission via the CB-PUSCH is not correctly performed and thus the transmission is failed, for example), it is possible to obtain the same results as in a case where a resource on PUSCH had to be requested beforehand (i.e. according to an SR scheme where a SCI is sent beforehand) since a SR transmission is always performed in this case. Thus, an "SR-only" fallback is always possible.

Consequently, by using the mapping of the SR resource on the CB-PUSCH resource for getting a specific CB-PUSCH resource, the user data can be sent in parallel to a SR resource while the source of the CB transmission can be derived. On the other hand, in case the CB transmission is not successful, in a worst case scenario, the result is the same as if only an SR is sent from the beginning. Hence, delay performance or latency time achievable by using the transmission scheme according to the example of the embodiment is never worse than with a mechanism using only SR, for example.

As indicated above, the deterministic usage of contention based resources provides obvious benefits for the system operation. For example, an inclusion of a full UE-ID (user equipment identification) on the CB-resource can be avoided, and a shorter temporal UE-ID can be used.

In this connection, it is to be noted that also the full UE ID may be included (i.e. instead of the temporal UE ID). This may be useful, for example, in a local area environment where UL coverage may be not such an issue, so that the transmission of the full UE ID is not a limiting factor.

Furthermore, error detection and correction mechanism like HARQ can be supported since the UE transmitting on CB-PUSCH can be identified even if the CB-PUSCH is not decoded correctly, due to the known combination with the dedicated SR resource. Furthermore, an implementation of a special contention based receiver at the eNB is not required.

Figure 2:
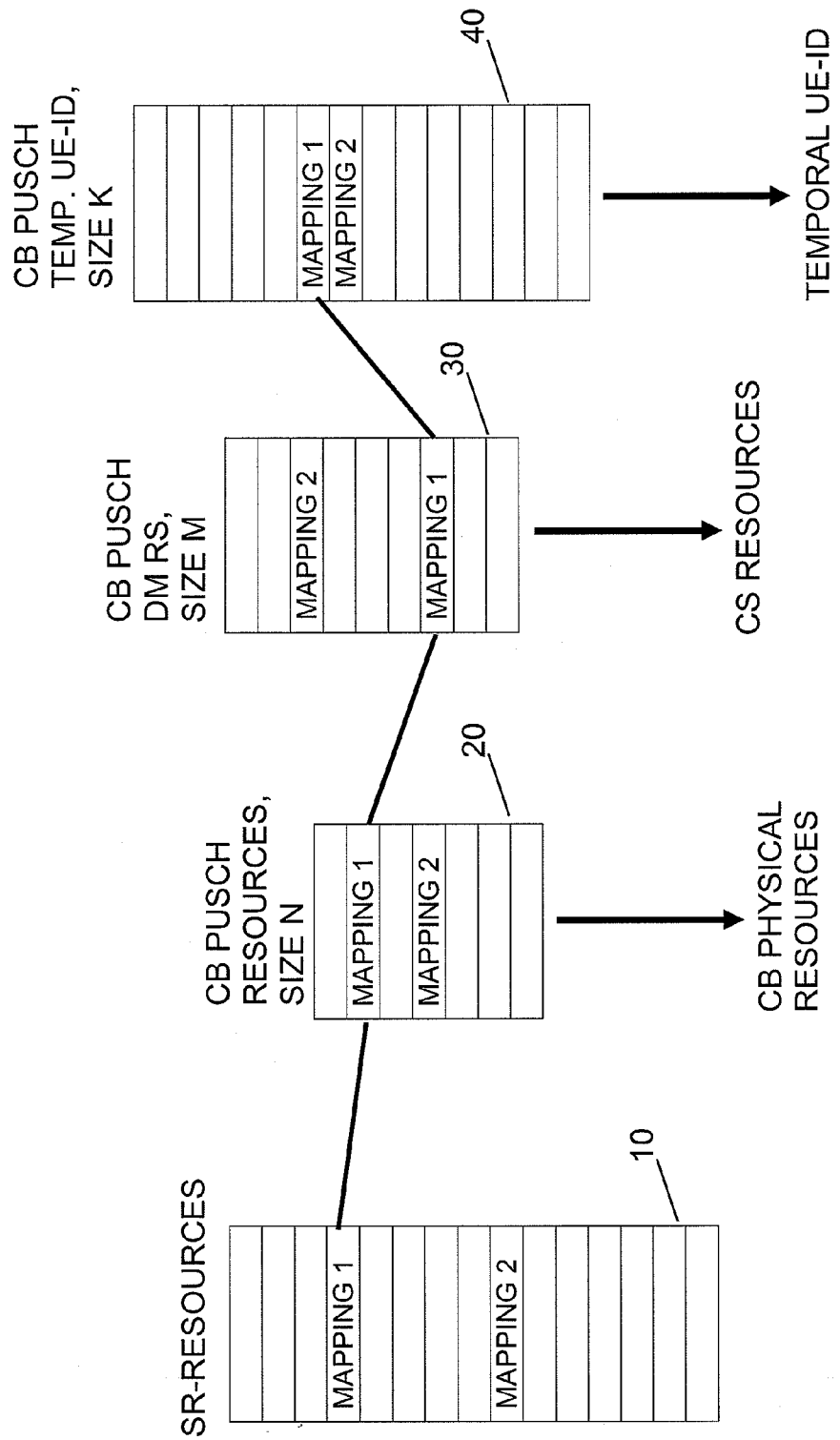
FIG. 2 shows a diagram illustrating a further example of a mapping between resources dedicated to a user equipment and resources allocated to a contention based communication.

In FIG. 2, a further example of an embodiment of the invention is shown which illustrates the combination of the dedicated SR resource and CB resources for an uplink transmission.

In the example according to FIG. 2, a resource mapping between the SR resource dedicated to the UE, for example, and CB resources is shown. The resources of the SR domain and the CB domain are illustrated in stacks 10, 20, 30 and 40. Stack 10 shows the SR resource elements. Stack 20 shows physical CB resources of CB-PUSCH (having a size or number of N). Stack 30 shows available CB-PUSCH DM RS (demodulation reference signal) resources (having a size or number of M) for the CB-PUSCH resource to be combined (defining, for example, a cyclic shift (CS)). These resources define, for example, a DM RS resource in terms of used cyclic shift and potentially orthogonal cover code applied over the (two) DM RS blocks in a sub-frame. Stack 40 shows available CB-PUSCH temporal UE-ID (having a size or number of K) providing temporal UE ID information for the CB-PUSCH resource to be combined. It is to be noted that the temporal UE ID may be included in a payload of a transmission using the CB resource (e.g. in MAC-layer message of CB-PUSCH), wherein the purpose of this temporal UE ID is to reduce the impact of a collision.

In detail, a mapping procedure for combining a resource element of the SR resources dedicated to the user available CB resources comprises, for example, a combination of one resource element of the SR stack 10 with a CB physical resource element of stack 20, a DM RS element or information of stack 30 and a temporal UE ID of stack 40. In FIG. 2, two mapping examples are indicated by "mapping 1" and "mapping 2" indicating the respective elements to be combined, e.g. for different UE having dedicated the corresponding SR element.

As indicated above, the mapping may be done in a pseudo-random manner, i.e. based on a predetermined algorithm or mapping rule. For example, the mapping is executed in the UE and the eNB in the following manner.

For configuring the CB resources to be used for the uplink transmission and for setting the resources to be used for this uplink transmission via the CB-PUSCH, a UE with an opportunity to transmit SR pre-reserves the at least a CB resource on CB-PUSCH (resource element in stack 20). For this purpose, a resource index as information identifying the resource elements to be combined is determined.

Optionally, besides the CB physical resource, additional resources for defining properties of the CB resource to be combined may be determined and selected, such as at least one element of stack 30 (i.e. a CS resource of demodulation reference signal) and/or of stack 40 (a temporal UE ID), wherein a corresponding information element or index, such as a demodulation reference signal index (CB-PUSCH DM RS: resource index for the cyclic shift of demodulation reference signal) or a temporary identification element or index is determined as (additional) information identifying the resource elements to be combined.

An example of a mapping rule or algorithm for combining SR and CB resources according to an example of an embodiment of the invention is described in the following. It is to be noted that both the UE and the eNB are aware of the mapping rule or algorithm as well as of the available resources from which the resources to be combined are selected (for example by a corresponding signaling of information concerning the dedicated SR resources and available CB resources between the UE and the eNB).

For example, the CB resources to be combined may be derived on the basis of input parameters known to both the UE and the eNB, such as the UE ID, a frame number to be used for the transmission, and one or more predetermined numbers (indicated as X, Y, Z in the following) which provides an applicable randomization minimizing consecutive collisions. These predetermined numbers may be derived, for example, by a random generator (wherein the number has to be exchanged between the UE and the eNB then), a number indicating the SR resource (SR resource number), or the like. The numbers X, Y and Z may be the same, but are preferably different numbers for increasing the randomization effect (for decreasing a collision probability).

In the present example, a modulo operation may be employed as the mapping rule in the following manner:

For determining the information identifying the resource element of CB-PUSCH (in stack 20), an operation according to $$\mod[(UE\_ID+frame\_number*X),N]$$

may be applied.

For determining the information identifying the resource element for CB-PUSCH DM RS, an operation according to $$\mod[(UE\_ID+frame_{13}\ number * Y),M]$$

may be applied.

For determining the information identifying the resource element for the temporal UE ID, an operation according to $$\mod[(UE\_ID+frame_{13}\ number * Z),K]$$

may be applied.

It is to be noted that there may be various ways to generate such a pseudo-random mapping between SR and CB-PUSCH resources wherein the above indicated modulo operation represents only one example.

Figure 3:
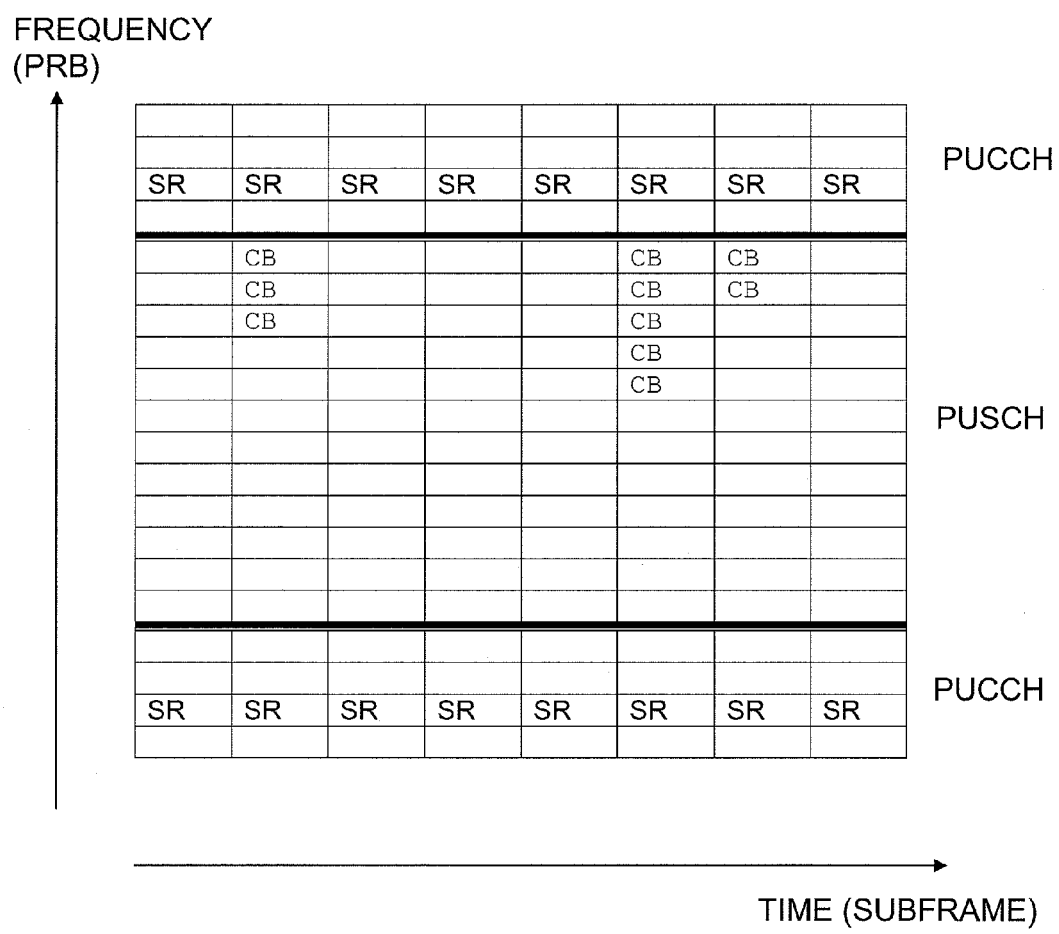
FIG. 3 shows a diagram illustrating a scheduling of resources in a frame structure comprising resources dedicated to a user equipment and resources allocated to a contention based communication.

FIG. 3 shows an example of an allocation of resources usable for the transmission in uplink direction according to the examples of embodiments of the invention. In detail, in FIG. 3, a diagram is depicted which illustrates a frame structure containing all resources provided on PUCCH and PUSCH within a specific number of sub-frames (time). In the ordinate direction of the frame structure of FIG. 3, the elements differ in frequency (Physical Resource Blocks (PRB)), while in the abscissa direction, the fields differ in their allocation to different sub-frames (transmission time intervals). The upper and lower edges of the frame (limited by a bold line, respectively) represent the PUCHH, while the intermediate portion represents the PUSCH. It is to be noted that this picture represents just an example of resource split between PUCCH and PUSCH. The current invention is not however limited to any specific resource split between PUSCH and PUCCH. For example, in a case (which is for example implemented in an LTE system) where an allocation of PUSCH and CB-PUSCH is also enabled outside the PUCCH region presented in FIG. 3, a corresponding resource setting as proposed by examples of embodiments is also applicable.

The allocation or reservation of resources may be done dynamically, for example by means of a signalling via the PDCCH, wherein for each sub-frame it is decided by the network control element, like the eNB, which elements (i.e. fields) are available for a contention based transmission (indicated in FIG. 3 by "CB" in the respective field. The number of fields may be different and changed from frame to frame. In the depicted example, three sub-frames contain CB-PUSCH resources of a number of 3, 5 and 2, respectively. Alternatively, the available CB-PUSCH resources may be also configured in a semi-static manner where corresponding resource elements are allocated to be available for CB transmission for a specific time or permanently.

In the PUCCH portion, resource elements dedicated to UE and to be used for SR (positive SR or negative SR) are indicated by "SR" in the respective field.

It is to be noted that as a result of a mapping of resources as shown in FIGS. 1 and 2, an SR element (for example in the first sub-frame) may be combined with an CB-PUSCH element in the second sub-frame or next available or any other sub-frame containing CB resources.

According to an example of an embodiment of the invention, a CB-PUSCH resource may be made available for any UE capable of transmitting SR. However, it is also possible to configure that only specific UEs are allowed to use the transmission scheme of combining SR and CB resources, i.e. to limit the CB access for predetermined UEs.

Figure 4:
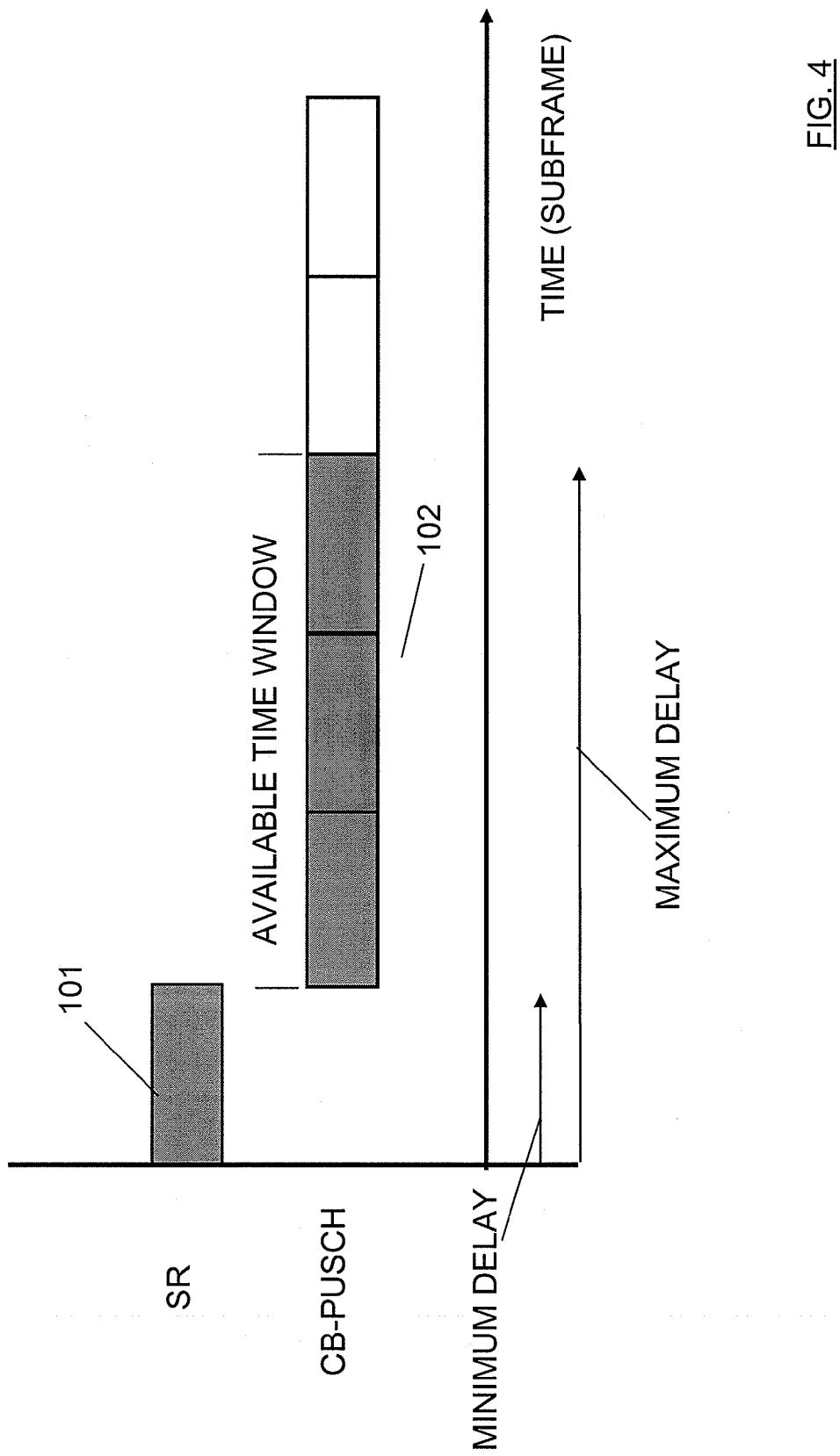
FIG. 4 shows a diagram illustrating relation of a timing for transmitting via resources dedicated to a user equipment and resources allocated to a contention based communication.

Furthermore, according to a further example of an embodiment of the invention, a configuration may be done where a time window relative to a SR transmission is defined. Only within this time window, the contention based resource is set to be available for the certain UE. A corresponding scheme is shown in FIG. 4. The transmission by using the dedicated SR resource is illustrated by the upper row with field 101 requiring a specific amount of time. Transmission times by CB-PUSCH are shown in the lower row with reference sign 102 denoting the time window, i.e. time slots available for the transmission of the CB-PUSCH transmission. The time window is defined by two parameters, i.e. a Minimum Delay and a Maximum Delay, calculated from the transmission of the SR.

If the minimum delay is set to zero, then a concurrent transmission of SR and CB-PUSCH is enabled.

On the other hand, if maximum delay is reached (the last slot in the time window), then the access to CB-PUSCH is cancelled and a CB transmission is not allowed, resulting basically into the fallback to SR-only mode. In this case the UE starts waiting for a regular UL scheduling grant initiated by SR, i.e. user data are not transmitted by using CB-PUSCH resources.

Both Minimum Delay and Maximum Delay may be parameters set specifically for a respective UE. For example, these parameters may be part of an LTE-Advanced SR configuration or dedicated CB-PUSCH configuration. However, also a general default setting of the parameters used by a plurality of UEs is possible.

As indicated above, there may be a situation where a collision occurs between transmissions of different UEs using CB based transmission (indicated, for example, in FIG. 1 when two UEs select the same CB-PUSCH resource). Such a collision is basically always possible in a CB transmission scheme. However, according to an example of an embodiment of the invention using a resource setting scheme as depicted, for example, in FIG. 1 or 2, since the CB resource can be linked to a dedicated SR resource, there is an increased possibility not to loose any data on the resources with collision (only in case when all the UEs transmitting on the same resource have the same DM RS and temporal UE ID, for example, data will be lost; probability of such an event can be decreased, however, by following the scheme according to FIG. 2, for example).

Namely, according to the example of the embodiment of the invention, it is possible to identify failed and correctly received packets (data transmissions) and to separate between them by having an additional separation on DM RS and/or temporal UE ID domain. By means of this, a receiver, such as a MU-MIMO capable receiver, is able to decode the CB-PUSCH transmission correctly.

According to a further example of an embodiment of the invention, an error detection and correction procedure can be executed, for example in the receiving site (eNB), when it is detected that the transmission using the CB-PUSCH transmission has failed. As one example for an error detection and correction procedure, HARQ is useable with the transmission scheme according to examples of embodiments of the invention.

Basically, HARQ is a functionality commonly used in connection with error detection and correction. According to the example of the embodiment, HARQ can be supported over the CB resource (in the first transmission) and following re-transmissions using normally dedicated PUSCH resources which may be scheduled on the basis of the detected SR accompanying the first CB-PUSCH transmission. For transmitting ACK/NACK of HARQ, it is possible to use the PHICH, wherein a corresponding PHICH resource is derived from PRB and DM RS information of the CB-PUSCH resource. Alternatively, a dynamic scheduling (on the PDCCH) for non-adaptive HARQ is applicable since the required UE ID(s) is (are) known on the basis of the dedicated SR(s) mapped on the CB-PUSCH resource based transmission which has failed. This is also possible in case of collisions.

Specifically, when there is a collision in the CB physical resource elements (PRB) and the CS resource (DM RS) (see FIG. 2, elements of stacks 20 and 30) between transmissions of two (or more) UEs, while the resource element related to the in temporal UE ID is different, the receiving site, i.e. the eNB signals NACK on PHICH if at least one transmission from the UEs on CB-PUSCH is decoded with error, i.e. a bundled (i.e. combined by logical AND) NACK is sent. Optionally, in this case, it is possible also possible to signal a "dedicated ACK" on the PDCCH for those UEs for which CB-PUSCH was received correctly. Otherwise, in case the CB-PUSCH transmission by all UEs is received correctly, the eNB sends ACK on PHICH.

On the other hand, when there is a collision in the CB physical resource elements (PRB), the CS resource (DM RS) and the resource element related to the in temporal UE ID (see FIG. 2, elements of stacks 20, 30 and 40) between transmissions of two (or more) UEs, the eNB signals NACK on the PHICH.

According to a further example of an embodiment of the invention, also the link adaptation, i.e. the matching of the modulation, coding and other signal and protocol parameters to the condition on the radio link between the UE and the eNB, for example, can be enhanced.

Conventionally, the starting point is that CB-resources utilize common MCS (Modulation and Coding Scheme)/PC (Power Control) parameters. These can be obtained for example via dynamically scheduled CB-PUSCH grants. However, in this case, MCS parameters common to all UEs have to set on the basis of conditions of cell edge located UEs. This may limit the capacity and/or coverage of CB-PUSCH.

A main reason for common MCS/PC parameter setting in the conventional contention based scheme is the need to limit the number of blind detection/decoding attempts at eNB to a feasible number. In the present example of the embodiment, blind detection/decoding on CB-PUSCH can be avoided, thus, removing the need for common MCS/PC parameter setting. According to the present example of the embodiment of the invention, it is possible to set a CB-PUSCH configuration by applying UE-specific (i.e. different for each UE) MCS and/or UE-specific PC parameters. These parameters can be set by eNB via higher layer signaling. Alternatively, it is possible to reuse/apply existing signaling available for semi-persistent-scheduling (SPS) for (re-)configuring the parameters. Cell specific MCS and/or PC setting offset parameters may be transmitted via PDCCH with the CB-PUSCH grant signaling (i.e. control data for the contention based resource selected for each user), for example. It is to be noted that the MCS and/or PC may be configured by using only the higher layer signaling even if cell specific MCS and/or PC setting offset parameters are transmitted via PDCCH. It is also possible to re-configure MCS/PC parameters dynamically (common to all UEs) in relation to the base level configured earlier. Thus, the capacity for CB-PUSCH can be improved via UE-specific MCS and PC parameter setting.

Figure 5A:
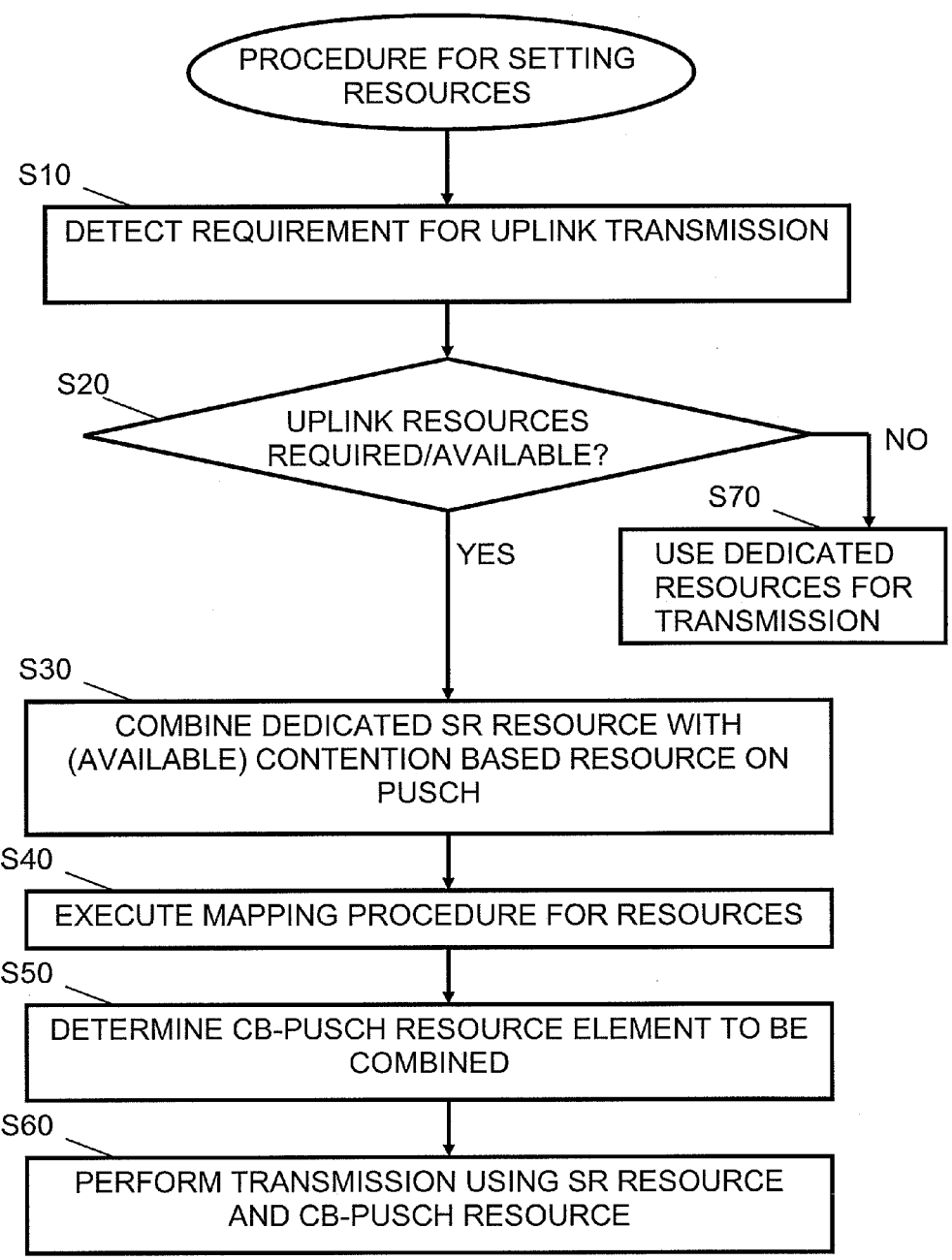
FIG. 5a shows a flow chart illustrating a method of setting resources executed in a transmitting network element according to an example of an embodiment of the invention.

In FIGS. 5a/5b, flow charts describing a resource setting procedure according to an example of an embodiment of the invention are shown. The resource setting procedure is executed by the UE (FIG. 5a) and the eNB (FIG. 5b) in a similar manner (i.e. the mapping rules and the input parameters are known to both the eNB and the UE).

Specifically, according to FIG. 5a, in step S10 the UE detects that data to be transmitted in the uplink direction is present (for example in a buffer). Thus, the UE determines in step S20 whether or not sufficient dedicated resources are available, e.g. on PUSCH, i.e. whether or not (additional) uplink resources are required and also available. If there are dedicated resources available (i.e. no further resources are required; step S20: NO), the UE uses these dedicated resources for the transmission (step S70). Otherwise, if additional resources are required, the UE recognizes that it has to send an SR by a dedicated SR resource for requesting such additional resources. In this connection, it is also checked whether a proper CB resource is available, i.e. whether a PUSCH resource is indicated to be available for the CB transmission at all, for example. If this is not the case, i.e. when there is no proper CB-PUSCH resource, for example, also step S70 is executed wherein the dedicated resources are then the SR resources for requesting dedicated PUSCH resources, for example (i.e. a fallback to SR-only transmission).

Thus, when in step S20 the determination result is YES (i.e. resources are required and also available), step S30 is executed in which a combination of the dedicated SR resource with available CB resources is executed, for example in accordance with the scheme shown in FIG. 1 or FIG. 2. For this purpose, in step S40, a mapping procedure is executed in a pseudo-random manner wherein the corresponding mapping rule or algorithm is used together with the input parameters (such as, for example, at least one of a number representing an identification element of the user equipment (UE ID), a frame number and at least one preset numerical value (X, Y, Z). As a result, in step S50, at least one contention based resource (CB-PUSCH resource, optionally with DM RS and/or temporal UE ID) which is to be combined with the SR resource dedicated to the UE is selected, wherein the selection is performed by determining a corresponding information identifying the CB-resource element (and optionally the DM RS index and UE ID information) to be combined with an index representing the SR resource element.

Then, when the combination of the SR resource and the CB resource is completed, the UE transmits in step S60 the data, wherein the transmission comprises the transmission of the SR and of at least a part of the user data by using by using the selected CB resource.

Figure 5B:
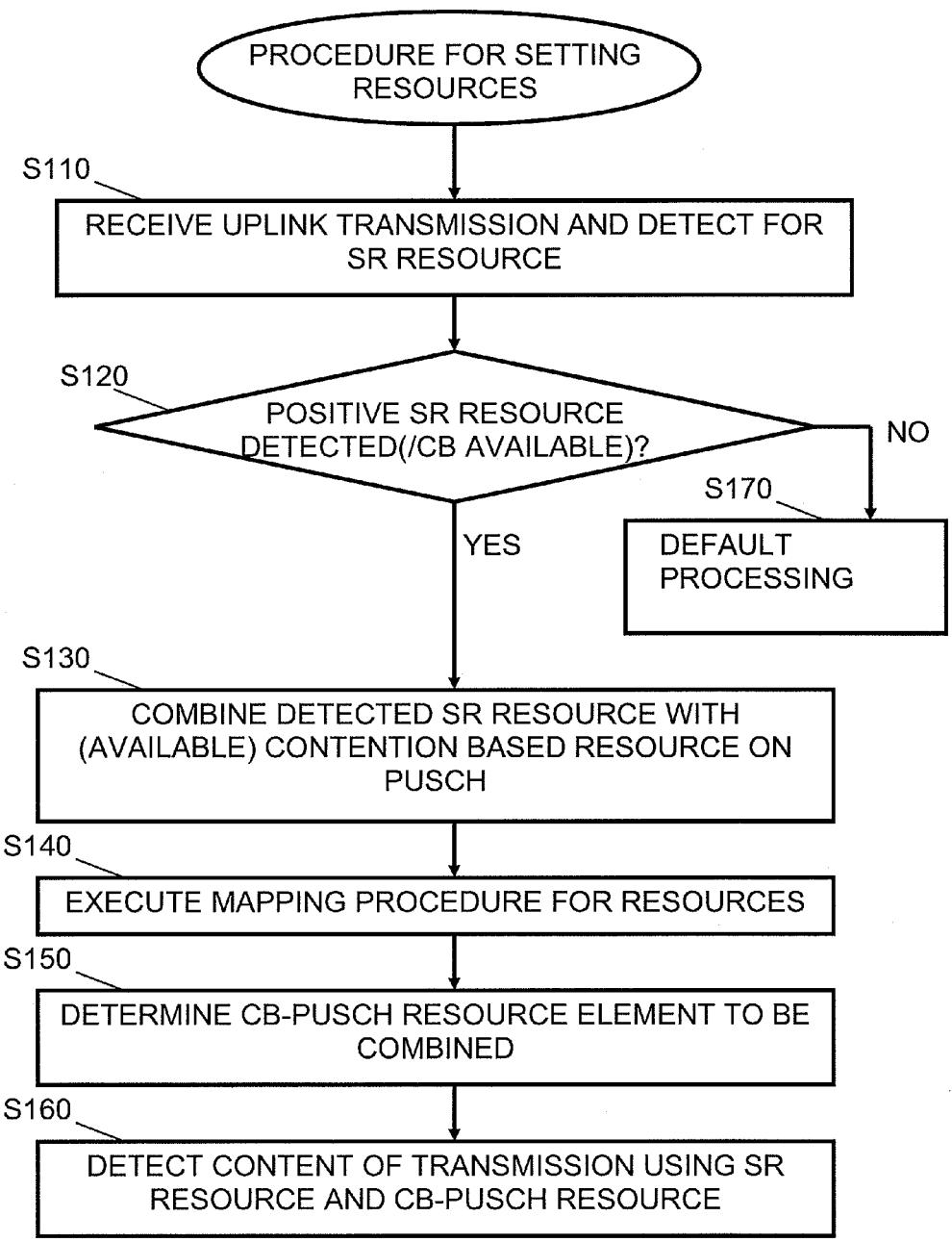
FIG. 5b shows a flow chart illustrating a method of setting resources executed in a receiving network element according to an example of an embodiment of the invention.

On the other hand, according to FIG. 5b, the eNB receives an uplink transmission from a UE in step S110. Usually, the in the uplink transmission using the transmission scheme according to examples of embodiments of the invention, first the SR resource based transmission is sent. Therefore, in step S120, the eNB detects for the resource dedicated to the user equipment (the SR resource) in the data transmission from the UE. In step S120, it is determined whether a positive SR resource is present. Optionally, it may also be checked whether a CB resource was available at all for the uplink transmission. If no positive SR is detected, in step S170, a default processing is executed assuming, for example, a normal CB or CF transmission (dedicated PUSCH resource). Optionally, if it is determined in S120 that a positive SR is present but that no CB resource (e.g. CB-PUSCH resource was available, the default processing in S170 may comprise a normal processing of the SR (SR-only fallback). Otherwise, in case a positive indication regarding the resource dedicated to the UE is detected (positive SR) (and optionally that CB resources were available), a detection for a CB resource combined therewith is executed. It is to be noted that the optional check regarding availability of CB resources may also be omitted, i.e. in case of a positive SR the decision in step S120 is always YES.

For this purpose, in steps S130 to steps 150, basically the same processing as in steps S30 to S50 according to FIG. 5a is executed, i.e. a mapping of the SR resource to available CB resources is done so as to determine via which CB resource the UE has transmitted user data.

When the corresponding CB resource is determined in step S150 on the basis of the determination of index information or the like, in step S160, the content of the CB-PUSCH is detected and processed (decoded).

It is to be noted that the processing in step S160 may also comprise additional measures, for example when the transmission has failed, a collision on CB-PUSCH is detected, or the like. In such case, the procedure may comprise also the following.

It may be detected whether a collision between transmissions from a plurality of UEs at the CB resource occurred, for example on the basis of a detection result for a transmission using the SR resource and on the basis of the predetermined mapping rule. If a collision occurs, the failed transmission may be identified and the UE may be identified on the basis of the information identifying the at least one resource element of the at least one contention based resource and the information indicating the specific resource element dedicated to the user equipment (SR and CB resource information (UE ID, SR resource index and the like)).

Furthermore, error detection and correction procedure (e.g. HARQ) may be executed based on the data received with the contention based resource. In case a failed transmission is detected, the UE sending the data being not correctly received may be identified on the basis of at least one SR and CB resource information (UE ID, SR resource index and the like)).

Figure 6A:
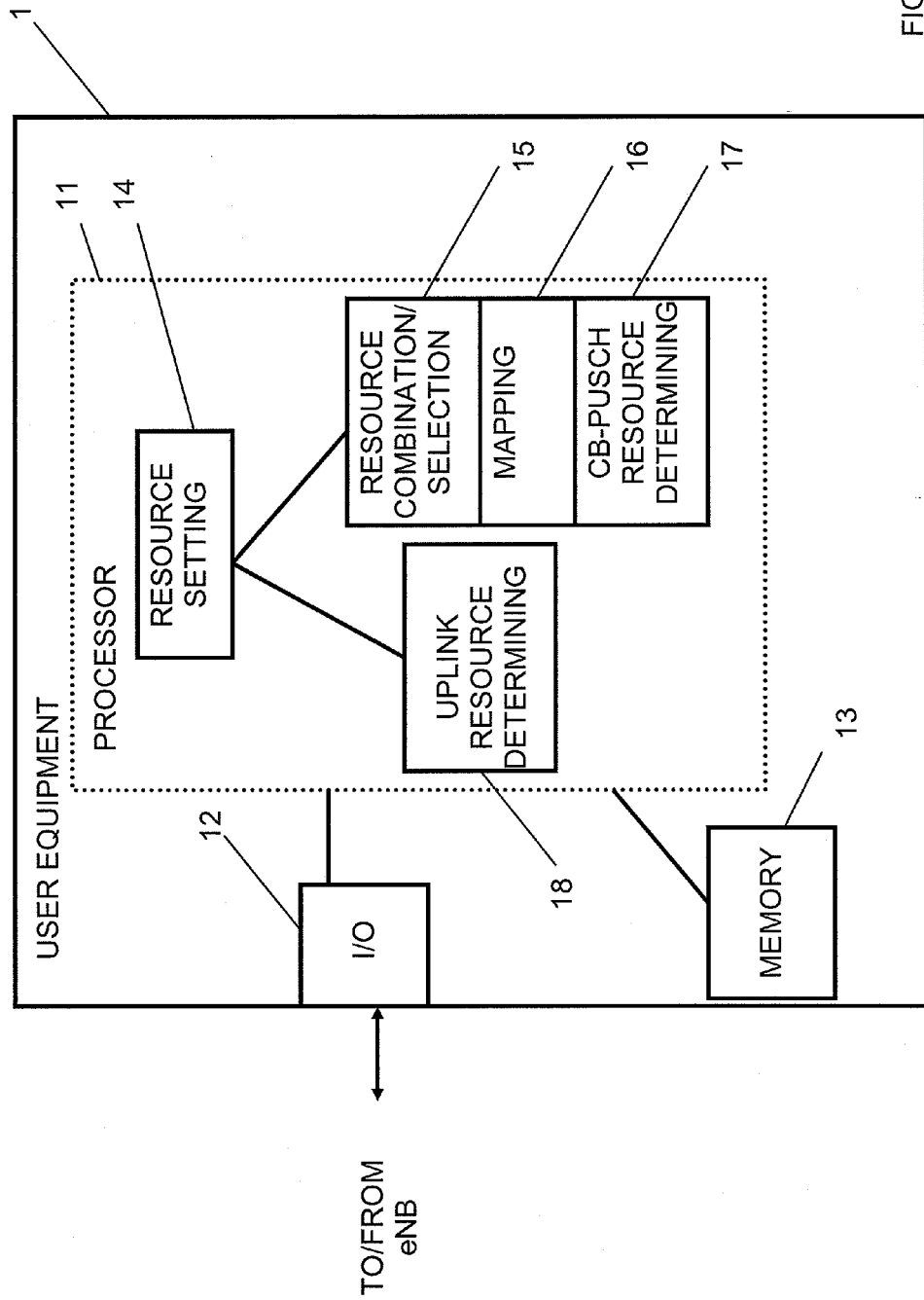
FIG. 6a shows a block circuit diagram illustrating a configuration of a user equipment capable of setting resources according to an example of an embodiment of the invention.

In FIGS. 6a/6b, block circuit diagrams illustrating a configuration of a UE (FIG. 6a) and a base transceiver station/eNB (FIG. 6b) capable of executing a procedure for setting resources according to an example of an embodiment of the invention are shown. It is to be noted that the shown network elements may comprise several further elements or functions besides those described in connection with FIG. 6a/6b which are omitted herein for the sake of simplicity as they are not essential for understanding the invention.

As shown in FIG. 6a, the user equipment 1 configured to execute a resource setting procedure according to FIG. 5a, for example, may comprise a processing function or processor 11, such as a CPU or the like, which executes instructions given by programs or the like related to the resource setting scheme. The processor 11 may comprise further portions dedicated to specific processings described below. However, the portions for executing these specific processings may be also provided as discrete elements or within one or more further processors, for example. Reference sign 12 denotes a transceiver or input/output (I/O) unit connected to the processor 11 (or corresponding other elements comprising the functions of the further portions). The I/O unit 12 may be used for communicating with a network control element, such as the base transceiver station/the eNB. The I/O unit 12 may also have a distributed structure with a plurality of different interfaces. Reference sign 13 denotes a memory usable, for example, for storing data and programs to be executed by the processor 11 (and/or the further portions dedicated to specific processings) and/or as a working storage of the processor 11 (and/or of the further portions dedicated to specific processings).

Regarding the portions for executing these specific processings related to the resource setting according to examples of embodiments of the invention a resource setting processing portion 14 is provided which decides on the requirement to request for CB resources and to combine them with SR resources, and which uses the resources for uplink transmission. This processing portion may also execute the check regarding the availability of CB resources, i.e. whether a fallback to SR-only transmission is to be effected. Reference sign 15 denotes a resource combination/selection processing portion which controls the selection and combination of the dedicated resources (SR resource, SR resource index) and the contention based resources (CB-PUSCH, optionally also DM RS, temporal UE ID). Reference sign 16 denotes a mapping processing portion which executes the mapping of, for example, the SR resource and the CB resources according to the mapping rules etc. Reference sign 17 denotes a contention based resource (e.g. CB-PUSCH resource) determining portion which is configured to identify the resource elements of the CB resources to be selected for the combination with the dedicated resource and to be used for the uplink transmission. Reference sign 18 denotes an uplink resource determining portion which is configured to determine which resources are available for the uplink transmission by a contention based transmission, for example by detecting information received via PDCCH from the eNB.

Figure 6B:
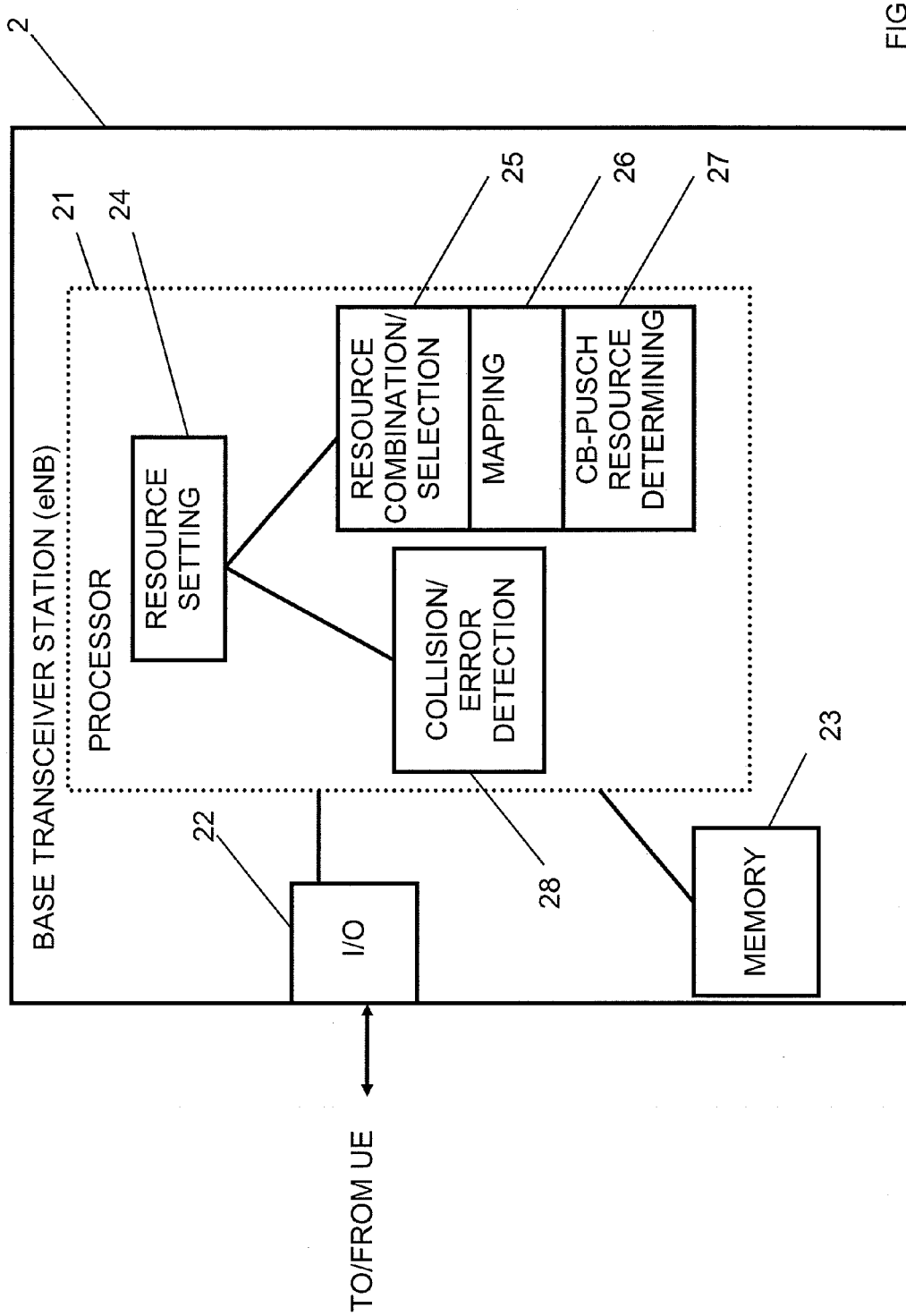
FIG. 6b shows a block circuit diagram illustrating a configuration of a base transceiver station capable of setting resources according to an example of an embodiment of the invention.

On the other hand, as shown in FIG. 6b, the base transceiver station 2 configured to execute a resource setting procedure according to FIG. 5b, for example, may comprise a processing function or processor 21, such as a CPU or the like, which executes instructions given by programs or the like related to the resource setting scheme. The processor 21 may comprise further portions dedicated to specific processings described below. However, the portions for executing these specific processings may be also provided as discrete elements or within one or more further processors, for example. Reference sign 22 denotes a transceiver or input/output (I/O) unit connected to the processor 21 (or corresponding other elements comprising the functions of the further portions). The I/O unit 22 may be used for communicating with a user equipment, such as the UE 1. The I/O unit 22 may also have a distributed structure with a plurality of different interfaces. Reference sign 23 denotes a memory usable, for example, for storing data and programs to be executed by the processor 21 (and/or the further portions dedicated to specific processings) and/or as a working storage of the processor 21 (and/or of the further portions dedicated to specific processings).

Regarding the portions for executing these specific processings related to the resource setting according to examples of embodiments of the invention a resource setting processing portion 24 is provided which decides on the requirement to detect for CB resources and to execute a combination determination with SR resources, for example if a positive SR is received, or to not detect for CB resources if a negative SR is received. This processing portion may also execute the check regarding the availability of CB resources, i.e. whether a fallback to SR-only processing is to be effected. Reference sign 25 denotes a resource combination/selection processing portion which controls the selection and combination of the dedicated resources (SR resource, SR resource index) and the contention based resources (CB-PUSCH, optionally also DM RS, temporal UE ID). Reference sign 26 denotes a mapping processing portion which executes the mapping of, for example, the SR resource and the CB resources according to the mapping rules etc. Reference sign 27 denotes a contention based resource (e.g. CB-PUSCH resource) determining portion which is configured to identify the resource elements of the CB resources to be selected for the combination with the dedicated resource and to be used for the detection of CB resources and their content. Reference sign 28 denotes a collision/error detection processing portion which is configured to execute collision determination and/or an error detection and correction processing.

As described above, by means of the proposed transmission scheme and the setting of resources for the transmission, it is possible to lower the complexity of equipment used for the eNB, since there is no need for blind decoding at the eNB side which is in particular useful in case variable transmission formats are supported, since the MCS can be derived/configured as described above. Moreover, the equipment used in the eNB can be standardized and avoids thus an excessive receiver complexity. For example, no special CB-PUSCH receiver is required.

The proposed scheme allows also a flexible reaction to changed transmission requirement or suddenly increased data amounts to be transmitted as it can use the CB resource of a common resource pool.

It is also possible to identify beforehand possible collisions, since the respective CB-resources where such a collision may occur are known at the eNB side on the basis of the SR detection when executing the mapping procedure. An orthogonal DM RS is often available. Hence, for example a MU-MIMO receiver (capable of contention based MU-MIMO) is able to solve the collisions. It is to be noted that MU-MIMO contains the features that the same (or at least an overlapping) frequency band is allocated to more than one UE, and that an orthogonal (or low-cross-correlation) reference signal is used. In the contention based MU-MIMO orthogonal reference signal resources are allocated in contention based manner.

Generally, by using the combination of the SR and CB resources, i.e. by using the SR as a preamble for the CB transmission, a higher collision probability value is acceptable so that the general efficiency of CB-PUSCH can be increased.

As mentioned above, SR as fallback is always available, if the eNB is not able to decode CB-PUSCH correctly. Thus, even if the CB transmission fails, the UL delay performance is not worse than in the conventional case. However, when the CB transmission combined with the SR transmission is used, the delay-tail problem of contention based PUSCH can be overcome.

Also transmission performance via the dedicated resource can be improved by using the proposed scheme. For example, an improved SR false alarm performance is achievable since a DTX detection is available also in CB-PUSCH.

Furthermore, as the length of temporal UE ID can be shorter, while a correct identification of the sending UE is still possible due to the mapping on the SR resource, the size of the necessary CB-PUSCH payload is reduced so that the now available space can be used otherwise.

However, as indicated above, for example in a local area environment, where the UL coverage may not be such limited, also the full UE ID may be included (i.e. instead of the temporal UE ID).

Thus, by adding the relative small SR resource in the uplink transmission (which has a good multiplexing capacity), wherein the reliability of the SR transmission is high, the robustness of the overall transmission can be improved. Additionally, as the acceptable collision probability on CB-PUSCH can be increased, the amount of resources needed for it can be reduced as well.

It is to be further noted that the proposed transmission and resource setting schemes may coexist with conventional transmission schemes, such as a conventional contention based transmission, for example when certain UEs utilize the proposed SR-assisted scheme (mapping of SR to CB-PUSCH, for example) while other UEs utilize the traditional CB scheme only.

For the purpose of the present invention as described herein above, it should be noted that an access technology via which signaling is transferred to and from a network element or node, e.g. between a user equipment and a base transceiver station, may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wirebound technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks including the base transceiver station may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, a modem card or another computer based equipment;

method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or processing portions likely to be implemented as hardware components at a terminal or network element, or any module (s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is proposed a mechanism by means of which resources for a data transmission between a user equipment and a base transceiver station are set. For this purpose, a resource dedicated to the user equipment (like an SR resource) is combined with at least one contention based resource allocated to a contention based transmission by the user equipment (like a CB-PUSCH resource). The at least one contention based resource to be combined is selected by executing a mapping according to a predetermined rule and based on an information indicating a specific resource element dedicated to the user equipment to at least one set of available contention based resources, and by determining an information identifying at least one resource element of the at least one contention based resource.

Although the present invention has been described herein before with reference to particular embodiments thereof, the present invention is not limited thereto and various modifications can be made thereto.

The invention claimed is:

1. A method comprising setting resources for a data transmission between a user equipment and a base transceiver station;

combining a resource dedicated to the user equipment with at least one contention based resource allocated to a contention based transmission by the user equipment resulting in the dedicated resource acting as a preamble for the contention based resource for the data transmission, wherein the combining comprises:

selecting the at least one contention based resource to be combined by executing a mapping according to a predetermined rule and based on an information indicating a specific resource element dedicated to the user equipment to at least one set of available contention based resources, and determining an information identifying at least one resource element of the at least one contention based resource.

2. The method according to claim 1, wherein the resource dedicated to the user equipment comprises a scheduling request resource element transmitted via an uplink control channel, and the at least one contention based resource comprises a contention based physical resource element allocated to the contention based transmission via an uplink shared channel.

3. The method according to claim 2, wherein
the information indicating a specific resource element dedicated to the user equipment is a scheduling request resource index, and
the information identifying the at least one resource element of the at least one contention based resource is a resource index of the contention based physical resource element.

4. The method according to claim 2, wherein
the information identifying the at least one resource element of the at least one contention based resource further comprises at least one of
a demodulation reference signal index, and
a temporary identification information for the user equipment included in a payload of the contention based transmission.

5. The method according to claim 1, wherein the mapping comprises:
executing a pseudo-random calculation based on predetermined input parameters known to the user equipment and the base transceiver station.

6. The method according to claim 5, wherein the predetermined input parameters comprise at least one of
a number representing an identification element of the user equipment,
a frame number, and
at least one preset numerical value.

7. The method according to claim 1, further comprising:
defining a time window based on a transmission time for the resource dedicated to the user equipment,
wherein the time window is defined by setting a minimum delay threshold and a maximum delay threshold in relation to the transmission time for the resource dedicated to the user equipment,
wherein an access to the contention based resource is allowed only in the time window.

8. The method according to claim 1, wherein the method is executed in the user equipment,
wherein the method is executed by the user equipment in case data are to be transmitted in an uplink direction and the resource dedicated to the user equipment is to be used for obtaining uplink resources,
wherein the user equipment transmits data by using the resource dedicated to the user equipment and at least a part of the data to be transmitted in the uplink direction by using the selected contention based resource.

9. The method according to claim 1, wherein the method is executed in the base transceiver station, wherein the method further comprises:
detecting for the resource dedicated to the user equipment in the data transmission from the user equipment,
wherein in case a positive indication regarding the resource dedicated to the user equipment is obtained, detecting for the contention based resource.

10. The method according to claim 9, further comprising:
detecting whether a collision between transmissions from a plurality of user equipments at the contention based resource is present, on the basis of a detection result for a transmission using the resource dedicated to the user equipment and on the basis of the predetermined mapping rule, and if a collision is present identifying a failed transmission; and
determining the user equipment of the plurality of user equipments on the basis of the information identifying the at least one resource element of the at least one contention based resource and the information indicating the specific resource element dedicated to the user equipment.

11. The method according to claim 9, further comprising:
executing an error detection and correction procedure based on data received with the contention based resource; and
in case a failed transmission is detected, identifying the user equipment sending the data being not correctly received on the basis of at least one of the information identifying the at least one resource element of the at least one contention based resource and the information indicating the specific resource element dedicated to the user equipment.

12. The method according to claim 11, wherein the error detection and correction procedure comprises a hybrid automatic repeat request procedure.

13. The method according to claim 1, further comprising:
configuring at least one of a modulation and coding scheme parameter and a power control parameter for the transmission between the user equipment and the base transceiver station, wherein at least one of the parameters is individually set for each of a plurality of user equipments on the basis of control data received for the contention based resource selected for each user equipment.

14. An apparatus comprising:
at least one processor; and at least one non-transitory memory including computer program code, wherein the at least one memory and the computer code are configured, with the at least one processor, to cause the apparatus to at least perform the following:
setting resources for a data transmission between a user equipment and a base transceiver station;
combining a resource dedicated to the user equipment with at least one contention based resource allocated to a contention based transmission by the user equipment resulting in the dedicated resource acting as a preamble for the contention based resource for the data transmission,
wherein the combining comprises:
selecting the at least one contention based resource to be combined;
mapping according to a predetermined rule and based on an information indicating a specific resource element dedicated to the user equipment to at least one set of available contention based resources; and
determining an information identifying at least one resource element of the at least one contention based resource.

15. The apparatus according to claim 14, wherein
the resource dedicated to the user equipment comprises a scheduling request resource element transmitted via an uplink control channel, and
the at least one contention based resource comprises a contention based physical resource element allocated to the contention based transmission via an uplink shared channel.

16. The apparatus according to claim 15, wherein
the information indicating a specific resource element dedicated to the user equipment is a scheduling request resource index, and the information identifying the at least one resource element of the at least one contention based resource is a resource index of the contention based physical resource element.

17. The apparatus according to claim 15, wherein
the information identifying the at least one resource element of the at least one contention based resource further comprises at least one of
a demodulation reference signal index, and
a temporary identification information for the user equipment included in a payload of the contention based transmission.

18. The apparatus according to claim 14, wherein the at least one memory and the computer code are further configured to, with the at least one processor, cause the apparatus to at least perform the following: executing a pseudo-random calculation based on predetermined input parameters known to the user equipment and the base transceiver station.

19. The apparatus according to claim 18, wherein the predetermined input parameters comprise at least one of
a number representing an identification element of the user equipment,
a frame number, and
at least one preset numerical value.

20. The apparatus according to claim 14, wherein the at least one memory and the computer code are further configured, with the at least one processor, to cause the apparatus to at least perform the following:
defining a time window based on a transmission time for the resource dedicated to the user equipment,
wherein the defining comprises setting a minimum delay threshold and a maximum delay threshold in relation to the transmission time for the resource dedicated to the user equipment,
wherein an access to the contention based resource is allowed only in the time window.

21. The apparatus according to claim 14, wherein the apparatus is comprised in the user equipment, wherein in case data are to be transmitted in an uplink direction by the user equipment and the resource dedicated to the user equipment is to be used for obtaining uplink resources, the at least one memory and the computer code are further configured, with the at least one processor, to cause the apparatus to at least perform the following:
setting resources for the transmission of the data to be transmitted in the uplink direction at the user equipment, and
transmitting, on the basis of the set resources, data by using the resource dedicated to the user equipment and at least a part of the data to be transmitted in the uplink direction by using the selected contention based resource.

22. The apparatus according to claim 14, wherein the apparatus is comprised the base transceiver station, wherein the at least one memory and the computer code are further configured, with the at least one processor, to cause the apparatus to at least perform the following:
detecting the resource dedicated to the user equipment in the data transmission from the user equipment, wherein in case a positive indication regarding the resource dedicated to the user equipment is obtained, detecting the contention based resource.

23. The apparatus according to claim 22, wherein the at least one memory and the computer code are further configured, with the at least one processor, to cause the apparatus to at least perform the following:
detecting whether a collision between transmissions from a plurality of user equipments at the contention based resource is present, on the basis of a detection result for a transmission using the resource dedicated to the user equipment and on the basis of the predetermined mapping rule;
identifying a failed transmission if a collision is present; and
determining the user equipment of the plurality of user equipments on the basis of the information identifying the at least one resource element of the at least one contention based resource and the information indicating the specific resource element dedicated to the user equipment.

24. The apparatus according to claim 22, wherein the at least one memory and the computer code are further configured, with the at least one processor, to cause the apparatus to at least perform the following:
executing an error detection and correction procedure based on data received with the contention based resource, and
identifying, in case a failed transmission is detected, the user equipment sending the data being not correctly received on the basis of at least one of the information identifying the at least one resource element of the at least one contention based resource and the information indicating the specific resource element dedicated to the user equipment.

25. The apparatus according to claim 24, wherein the at least one memory and the computer code are further configured, with the at least one processor, to cause the apparatus to at least perform the following:
executing a hybrid automatic repeat request procedure as the error detection and correction procedure.

26. The apparatus according to claim 14, wherein the at least one memory and the computer code are further configured to, with the at least one processor, cause the apparatus to at least perform the following:
configuring at least one of a modulation and coding scheme parameter and a power control parameter for the transmission between the user equipment and the base transceiver station, wherein the parameter is individually set for each of a plurality of user equipments on the basis of control data received for the contention based resource selected for each user equipment.

27. A computer program product embodied on a non-transitory computer-readable medium in which a computer program is stored that, when being executed by a computer, is configured to provide instructions to control or carry out:
setting resources for a data transmission between a user equipment and a base transceiver station;
combining a resource dedicated to the user equipment with at least one contention based resource allocated to a contention based transmission by the user equipment resulting in the dedicated resource acting as a preamble for the contention based resource for the data transmission,
wherein the combining comprises:
selecting the at least one contention based resource to be combined by
executing a mapping according to a predetermined rule and based on an information indicating a specific resource element dedicated to the user equipment to at least one set of available contention based resources, and
determining an information identifying at least one resource element of the at least one contention based resource.

* * * * *